United States Patent [19]

Mosher, Jr.

[11] Patent Number: 5,609,716
[45] Date of Patent: Mar. 11, 1997

[54] APPARATUS FOR MANUFACTURING AND DISPENSING IDENTIFICATION BRACELETS

[75] Inventor: Walter W. Mosher, Jr., Northridge, Calif.

[73] Assignee: Precision Dynamics Corporation, Van Nuys, Calif.

[21] Appl. No.: 370,830

[22] Filed: Jan. 10, 1995

Related U.S. Application Data

[63] Continuation of Ser. No. 973,269, Nov. 9, 1992, abandoned.

[51] Int. Cl.⁶ .................................................. B32B 35/00
[52] U.S. Cl. ........................... 156/522; 156/384; 156/542; 156/552; 156/238; 156/249
[58] Field of Search ...................................... 156/384, 510, 156/541, 542, 552, 249, 238, 250, 522; 40/6, 633; 283/80

[56] References Cited

U.S. PATENT DOCUMENTS

| | | |
|---|---|---|
| 3,992,244 | 11/1976 | Craig .................................... 156/541 X |
| 4,057,015 | 11/1977 | Kodis .................................... 101/349 X |
| 4,240,862 | 12/1980 | Ishiyama ............................. 156/384 X |
| 4,631,845 | 12/1986 | Samuel et al. . |
| 4,916,841 | 4/1990 | Dawson .................................... 40/6 X |
| 4,980,011 | 12/1990 | Gruber et al. ...................... 156/238 X |
| 5,411,294 | 5/1995 | Diemert .................................... 40/6 X |

Primary Examiner—David A. Simmons
Assistant Examiner—M. Curtis Mayes
Attorney, Agent, or Firm—Thomas P. Mahoney

[57] ABSTRACT

An apparatus for fabricating an identification bracelet intended for immediate application without modification to an object to be identified upon the issuance of the bracelet from the apparatus incorporates a source of bracelet strip material; information imparting means for imparting information regarding the object and storing it upon the surface of a strip; fastener transfer means for applying fastener means to the strip at only one extremity of the strip; severance means for separating the strip into bracelet lengths conformable to the size of the object to be identified; and an exit from said apparatus whereby said bracelet is delivered to the user with said fastener means exposed for immediate application of said bracelet.

7 Claims, 1 Drawing Sheet

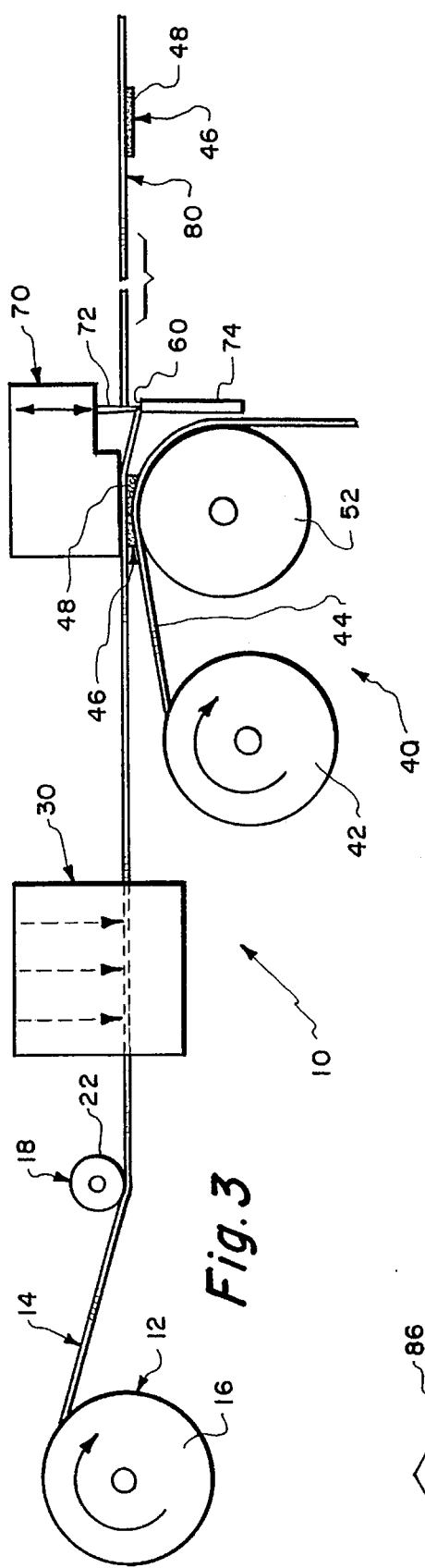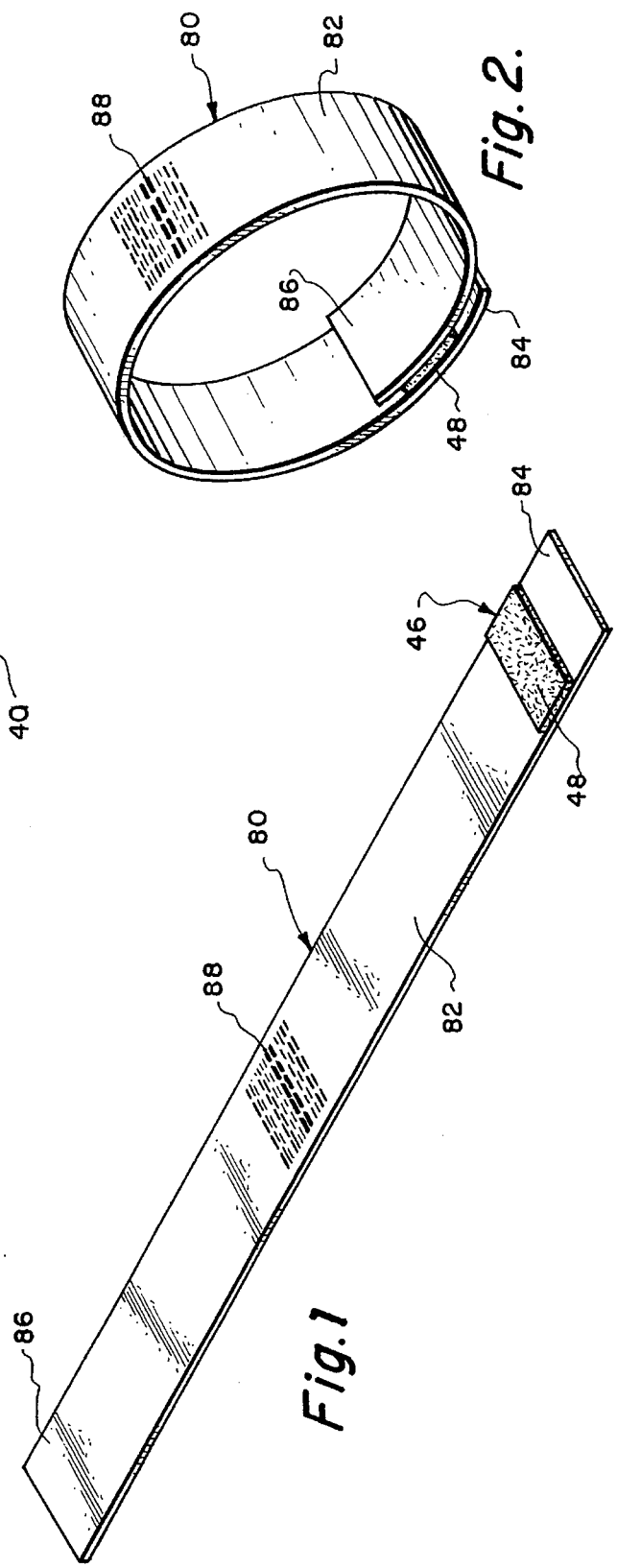

APPARATUS FOR MANUFACTURING AND DISPENSING IDENTIFICATION BRACELETS

This application is a continuation of application Ser. No. 07/973,269, filed on Nov. 9, 1992, now abandoned.

This invention relates to identification bracelets or bands which are widely used in a variety of applications including patient identification, crowd control, inanimate object identification, and the like.

BACKGROUND OF THE INVENTION

The invention will be described hereinbelow as utilized in a crowd control context, but it will be understood that it can be used in other applications where ease of installation, speed of imparting information to the bracelet, and elimination of existing waste disposal problems incident to the utilization of available bracelets are desirable.

Prior art bracelets are utilized in crowd control contexts such as amusement parks, ski lifts, and rock concerts. They are applied to the wrists of the persons visiting the amusement park, utilizing the ski lift, or attending the concert in order to identify the customer and prevent various abuses which arise where large numbers of individuals congregate.

Various types of prior art bracelets have been utilized in the above-mentioned situations, including bracelets fabricated from plastic sheet materials such as vinyl and various forms of plastic reinforced papers wherein the cellulosic content of the papers is bonded and strengthened by the plastic binder. Fasteners for these bracelets include plastic snap type fasteners, metallic rivet type fasteners, and adhesive fasteners.

All of the prior art bracelets are supplied in cartons and the adhesive bracelets incorporate adhesive isolation means which must be discarded at the point of application of the bracelet to an individual.

Moreover, where thousands of visitors are accommodated every day at amusement parks or ski lifts, correspondingly large inventories of the identification bracelets must be maintained and large quantities of cartons of such bracelets must be provided at the ticket booth.

In some applications, prior art bracelets are provided with information receiving surfaces and the cashier must, where the information is visually cognizable, type the requisite information on the receiving surface. This entails the removal of the bracelet from its carton, the insertion of the bracelet in the information printer and the subsequent imparting of the information to the surface. After the information imparting step is completed, the bracelet is removed from the printer and installed upon the wrist of the wearer.

Some prior art bracelets include electronic information receptor means such as magnetic strips or the like and the information is imparted to the magnetic strip by corresponding electronic information conveyors. However, the same basic sequence of time consuming steps must be followed as in the case of the visually cognizable information.

Bar coding of bracelets is another method of conveying information regarding the individual and the extent of his purchases. For instance, the bracelet for a concert can incorporate visually perceptible information regarding seat assignments; for amusement parks, the number of rides to which the individual is entitled; and, for ski lifts, the numbers of lifts and the numbers of rides to which the individual is entitled. Additional or alternative information regarding the extension of credit or spending limit available to an individual may be incorporated in the information imparted to the bracelet.

Where thousands of people are entering a facility, it is obvious that the inventory, storage, and bracelet preparation and installation upon a wearer are expensive and time consuming aspects of present bracelet usage. Because of the packaging and discarded components of conventional bracelets, there is a significant accumulation of scrap and waste materials at the point of application of such bracelets.

OBJECTS AND ADVANTAGES OF THE INVENTION

It is, therefore, an object of my invention to provide an apparatus for manufacturing an identification bracelet at the point of application to the potential wearer of the bracelet. Such an apparatus eliminates the necessity for maintaining bracelet inventories and the waste disposal problems entailed by the conventional cartons of bracelets and the additional materials which must be discarded during bracelet application.

Another object of my invention is the provision of an apparatus of the aforementioned character which includes a source of material in strip form from which a bracelet can be manufactured and means for translating said strip through the apparatus. An associate object of the invention is the provision of information imparting means to a surface of said strip or into a magnetic strip or RF chip or other electronic information storage means previously imprinted or installed upon said strip. Such information can include individual identification and the various ramifications of data necessary for the particular application for which the bracelet manufactured by the apparatus is utilized.

Another object of my invention is the provision of an apparatus of the aforementioned character which includes information imparting means which is capable of supplying information to the bracelet during the manufacturing process of the bracelet and which can be visually cognizable, electronic or bar code stored information.

An additional object of the invention is the provision of an apparatus of the aforementioned character wherein the fastener means utilized to secure the bracelet in operative relationship with the wrist of an individual is installed on the bracelet during the manufacturing process.

An associated object of my invention is the utilization of adhesive fastening means and the incorporation in the apparatus of conveyor means for conveying said adhesive fastening means into contiguity and subsequent transfer to a surface of the bracelet during its translation through the aforesaid apparatus.

An additional object of my invention is the provision of severance means in said apparatus whereby, when all of the bracelet manufacture has been completed, the bracelet is issued from the apparatus and cut by said severance means to a predetermined length. Instead of severance means, perforators can be utilized which form perforations in the strip to facilitate the severance of a bracelet from said strip.

A particular object of the invention is the manufacture of a bracelet incorporating adhesive fastening means which is issued from the aforesaid apparatus and is ready for immediate application to the wrist of a wearer without the necessity for discarding the conventional adhesive isolation means utilized in adhesive identification bracelets to prevent premature adherence of the adhesive fastening means to an adjacent surface.

Another object of the invention is the provision of a method of manufacturing an identification bracelet capable of immediate use and application to the wrist of the wearer which includes the steps of providing a continuous strip of bracelet material and translating said strip to an information imparting means. Associated steps include the deposition of information on a surface of said bracelet by said information imparting means and the transfer to a surface of said bracelet of fastening means intended to maintain the bracelet in operative relationship with the wrist of a wearer.

The final step of the method includes the severance of the bracelet in a length sufficient to encompass the wrist of the wearer. This may be achieved by presetting the apparatus so that bracelets of a uniform length are issued from the apparatus or by controlling the input of information to the bracelet in such a manner that the means for translating the bracelet strip can cause a variance in the length of the bracelet to adapt it, for instance, to the wrist of a child rather than an adult.

Another object of my invention is the provision of a bracelet capable of instantaneous use after issuance from the aforesaid apparatus, said bracelet having all of the necessary information imparted thereto and incorporating fastener means which is capable of immediate adherence to the adjacent surface of a cooperating extremity of said bracelet, said fastening means being constituted by a suitable adhesive.

Other objects and advantages of the invention will be obvious from the following specification and the accompanying drawings.

DESCRIPTION OF THE DRAWINGS

FIG. 1 shows a bracelet manufactured in accordance with the method and by use of the apparatus of the invention;

FIG. 2 shows the bracelet of FIG. 1 in the installed condition; and

FIG. 3 is a schematic view illustrating the components of the apparatus and the practice of the steps of the method of the invention.

DESCRIPTION OF PREFERRED EMBODIMENTS OF THE INVENTION

A. THE APPARATUS

Shown schematically in FIG. 3 of the drawings is the apparatus 10 of the invention which, of course, is intended to be incorporated in a cabinet of relatively small dimensions so that the apparatus can be juxtaposed to the cashier in the ticket booth of the enterprise at which the apparatus 10 is installed. Incorporated in the apparatus 10 is a source 12 of bracelet strip material 14 said source including a reel 16 of said material. Alternatively, the strip material can be provided in fan-folded or other configurations and dispensed from a suitable receptacle.

The strip material 14 is shown as following a generally lineal path through the apparatus 10, but it will be obvious to those skilled in the art that, in the interests of space economy, a more circuitous path can be followed by the strip material as required by the closer juxtaposition of the elements of the apparatus 10.

Juxtaposed to the lineal path of the strip material 14 is translating means 18, said translating means including a drive roller 22 frictionally engaged with the surface of the bracelet strip 14 for frictionally driving the strip through the apparatus 10.

The drive roller 22 can be rotated by an electric motor or similar means, but it is preferable that a stepper motor or the like be utilized in the apparatus because the method of the invention requires that the strip 14 be halted intermittently for purposes to be discussed in greater detail hereinbelow.

By suitable control means, not shown, the speed of the stepper motor can be regulated to control the translation of the bracelet strip 14 through the apparatus 10 and control the length of the dwell times necessitated by the method of the invention.

Information is applied to a surface of the bracelet at the point of application of the bracelet to the wrist of the wearer. Where prior art expedients are utilized, this entails the utilization of a suitable printer or other information imprinting device into which the prefabricated bracelet is introduced and the imparting of the requisite information regarding the purchaser, and the privileges to which the purchase of the bracelet entitles him, to the surface of the bracelet or into the aforesaid magnetic strip and/or RF chip. The stepper motor can be eliminated and continuous movement of the strip 14 can occur.

An information imparting device 30 is included in the apparatus 10 and, during a dwell period established by the stepper motor previously averted to, imprints or otherwise imparts the requisite information about the individual and the extent of his purchase privileges to the adjacent surface of the bracelet strip 14. Where continuous movement of the strip occurs, the imparting of the requisite information can be achieved by the imparting device 30 while the strip is moved with or relative to said device.

A wide variety of expedients is utilizable in imparting information to the bracelet strip 14. Among them are mechanical printout devices which impart visually cognizable information to the surface of the bracelet strip 14. There are also electronic information imparting devices capable of storing information on a magnetic strip or the like previously imprinted on the surface of the bracelet strip 14 at predetermined intervals.

In addition, there are mechanisms for the imprinting of bar codes on the surface of the bracelet strip 14. In any event, during the manufacture of the bracelet, the individual's identification and ancillary information are provided in one way or another on the surface of the bracelet strip 14. This information is generated at the point of sale during the manufacture of the bracelet and the necessity for the frequent handling of the bracelet by insertion into one form of printer or information imparting device or another is eliminated with consequent economies in time and handling.

Downstream of the information imparting means 30 is fastener supply or conveyor means 40, said fastener supply means including a storage reel 42 for a strip 44 of release paper or similar material which has patches of fastening means 46 deposited thereupon at spaced intervals. The fastening means 46 is constituted by a patch of adhesive 48. The strip of release material 44 is entrained upon an applicator wheel 52 which rotates simultaneously with and at the same speed as the reel 42 and is adapted to apply pressure to the fastener conveying strip 44 to cause the transfer of the adhesive patch 48 to a surface of the bracelet strip 14.

Located adjacent the exit 60 of the apparatus 10 is severance means 70 which includes a cutting blade 72 or perforation and a cutting anvil 74 adapted to sever a bracelet 80 of suitable length from the parent strip 14. It will be noted that the adhesive patch 48 is provided without any isolating means customary with adhesively fastened bracelets so that the bracelet 80 can be immediately applied to the wrist of a wearer immediately upon its exit from the apparatus 10.

The utilization of the apparatus 10 eliminates the current necessity for maintaining inventories of identification bracelets and storage of the same at the point of utilization. Also eliminated is the necessity for insertion of the bracelet in a suitable printing device or the like and the removal thereof after imprinted or otherwise applied information is stored on the surface of the bracelet.

In addition, where adhesive fastening means is utilized, the bracelet is applied without removal of an isolating means from the adhesive patch. The economic benefits of the utilization of the apparatus include the elimination inventory expense and storage, and the time and energy saved in the imparting of information to a previously fabricated bracelet as well as the ease of installation of the instantaneously provided bracelet.

The method of the invention is directed to the broad concept of the provision of an instantaneously installable bracelet on the wrist of a wearer at the point of sale and the elimination of inventories of prefabricated bracelets and waste and detritus incident thereto.

The primary step of the invention includes the supplying of bracelet material in strip form to the apparatus. The most expedient way is by providing the bracelet strip 14 on a storage reel 16 whence it is drawn by the translating means 18.

The next step involves the temporary cessation of movement of the bracelet strip material through the apparatus so that information regarding the individual and the extent of his purchased privileges can be provided on a surface of the bracelet. As previously mentioned, the strip material can also be translated continuously throughout the apparatus.

As previously mentioned, the information imparting step can be accomplished by a variety of readily available prior art expedients. Once the information imparting step has been completed, translation of the bracelet strip is resumed and delivery thereof is made to the fastener means application portion of the apparatus where the fastener means in the form of an adhesive patch is applied to the surface of the bracelet strip. A severance or perforation step then occurs to sever a suitable length of bracelet to provide the identification bracelet 80 at the point of exit 60 from the apparatus. Where continuous translation of the strip occurs, the information imparting step can take place during the movement of the strip.

It will be obvious to those skilled in the art that various mechanical and electronic expedients can be utilized to practice the steps of the method and that the steps are not limited to a particular form or configuration of apparatus.

B. THE BRACELET

The bracelet 80 is constituted by an elongated strip 82 of flexible material which can be selected from a wide variety of available expedients. For instance, vinyl or polyethylene or polypropylene material or laminates consisting of vinyl materials incorporating mylar reinforcements can be utilized. Frequently utilized in the bracelet art are high strength papers which are fabricated by assembling the cellulosic components thereof with suitable polymers such as epoxy derivatives.

The bracelet 80 has first and second extremities 84 and 86 which are overlapped into the configuration of FIG. 2 of the drawings to encircle the wrist of the wearer of the bracelet.

As previously mentioned, an intermediate surface 88 of the bracelet 80 is provided for the reception of information regarding the individual purchaser and the scope of his purchase. Of course, such information can be placed anywhere between the extremities of the bracelet surface.

For instance, in amusement parks, the information can include the rides to which he is entitled. Similar information can be utilized at ski lifts where the amount of time the purchaser is entitled to use the lifts may be inscribed. This information, as previously mentioned, may be visually cognizable or may be read by electronic means if the bracelet includes a magnetic strip, bar code imprinting, or RF chip.

Provided on the bracelet 80 is fastening means 46 constituted by a patch of adhesive 48. The adhesive 48 can be any one of a large number of pressure sensitive adhesives which are capable of resisting the release of the overlying extremities 84 and 86 of the bracelet 80 from each other. Therefore, there can be no transfer of the bracelet 80 from one individual to another. It will be noted that the adhesive patch 48 on the bracelet 80 is exposed and that no releasable isolating means overlies the same to prevent the inadvertent adherence of the adhesive patch to an adjacent surface. This construction eliminates the conventional isolation means which is frequently constituted by a paper cover having a releasing agent provided thereupon. Therefore, the sales clerk need not be involved in the removal of such cover and the detritus which results from supplying bracelets to hundreds of customers during the average work day.

Consequently, by the practice of the method of the invention and the provision of the bracelet and apparatus thereof, many of the problems inherent in present day identification bracelet supply are eliminated, with consequent economies in the supply of the bracelets of the invention and the elimination of unnecessary expenditures of time and energy incident to the utilization of conventional identification bracelets.

Although I have shown a specific type of apparatus, it will be obvious to those skilled in the art that the method of the invention can be practiced and the bracelet of the invention manufactured by the use of alternative apparatus.

I claim:

1. In an apparatus for fabricating an identification bracelet intended for immediate application without modification to an object to be identified upon the issuance of said bracelet from said apparatus, the combination of: a source of bracelet strip material; information imparting means for imparting information regarding said object and storing it upon a surface of said strip; adhesive fastener transfer means for applying said fastener means to said strip only at one extremity of said strip; severance means for separating said strip into bracelet lengths conformable to the size of the object to be identified by said bracelet; and an exit from said apparatus whereby said bracelet is delivered to the user with said bracelet and said fastener means exposed for immediate application of said bracelet.

2. The apparatus of claim 1 including means for translating said strip and said transfer means through said apparatus.

3. The apparatus of claim 1 in which said information imparting means provides visually readable information upon a surface of said bracelet.

4. The apparatus of claim 1 which includes means for applying electronically imparted information on said surface of said strip and said information imparting means is an electronic information source.

5. The apparatus of claim 4 in which said fastener means is constituted by adhesive with one surface exposed applied to said surface of said strip with one surface exposed.

6. The apparatus of claim 1 in which said apparatus incorporates a source of fastener means constituted by fastener means transfer means having said fastener means applied to a surface thereof in predetermined spaced relationship and in which said transfer means is juxtaposed to said bracelet strip to transfer said fastener means to said extremity.

7. The apparatus of claim 6 in which said fastener means is constituted by adhesive material releasable from said transfer means and transferable to said strip extremity.

* * * * *